March 10, 1953     H. NIERHAUS     2,631,054

SEAL

Filed July 1, 1949

INVENTOR.
HENRY NIERHAUS
BY

Patented Mar. 10, 1953

2,631,054

UNITED STATES PATENT OFFICE 2,631,054

SEAL

Henry Nierhaus, Scarsdale, N. Y., assignor to Stoffel Seals Corporation, Tuckahoe, N. Y.

Application July 1, 1949, Serial No. 102,519

3 Claims. (Cl. 292—316)

The invention relates to seals and more particularly to a tamperproof metal seal adapted to be applied to wood, the main application being to cover up the bung of a wooden cask.

There has been a definite need for a tamperproof seal for wooden casks used in the storage of taxable distilled spirits, where a certain loss occurs through evaporation or absorption into the wood of the cask. The purpose of the proposed seal is to assure the assessment of the exact amount of the contents left after storage, and to prevent unauthorized tapping of the casks.

The main object of the invention is to provide a novel seal for the purpose described which is of sturdy construction and can be driven into the wood of the cask but is weakened in such a manner that it cannot be removed without breakage.

Another object of the invention is to provide a smaller number of longer prongs which assure a good hold in the wood after they are driven in, and a greater number of shorter prongs which serve to prevent the insertion of a tool under the rim of the seal when tampering is attempted.

Other objects and advantages of this invention will be apparent from the following description considered in connection with the accompanying drawing submitted for the purpose of illustration and not to define the scope of the invention, reference being had for that purpose to the subjoined claims. In the drawing, wherein similar reference characters refer to similar parts throughout the several views:

Before explaining the present invention in detail, it is to be understood that the invention is not limited in its application to the details of construction and arrangements of elements illustrated in the accompanying drawing, since the invention is capable of other embodiments and of being practised or carried out in various ways. Also it is to be understood that the phraseology or terminology employed herein is for the purpose of description and not limitation.

Figure 1:
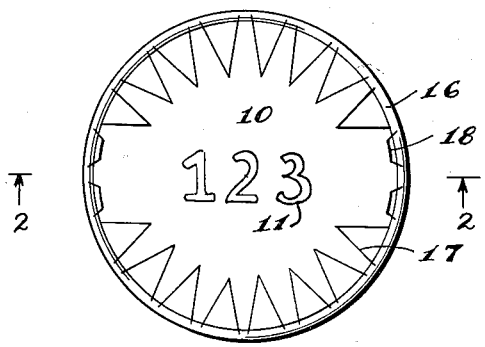
Fig. 1 is a top view of the seal embodying the invention.

The novel seal or tag is made of a single metal stamping having a recessed circular flat wall 10, whose face, as shown in Fig. 1, is suitable for carrying identifying numerals or other indicia 11. Wall 10 has a rim 16 with a plurality of equally spaced long teeth or prongs 12 and intermediate shorter prongs 13 perpendicular to the plane of wall 10. Both types of teeth are reinforced with ribs 14 and 15 respectively, so they are suited to be driven into wood. The rim 16 of wall 10, at the base of teeth 12 and 13 is strengthened by the half-round shape which forms an annular stiffening rib around the periphery of wall 10. The purpose of rim 16 is also to provide a form that cannot be repaired after the seal has been tampered with, and where any deformation is readily noticeable. To further render the seal tamperproof, I provide a plurality of perforations or slits 17 and 18 which weaken partly the rim and cause same to break away from wall 10 when an attempt is made to pry the teeth out of the wood with some instrument. A sheared cut 19 adjacent to the teeth 12 also causes a tear in continuation of line 19 when teeth 13 are pried up.

Figure 2:
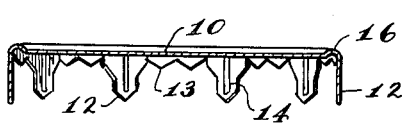
Fig. 2 is a section taken on line 2—2 of Fig. 1.
Figure 3:
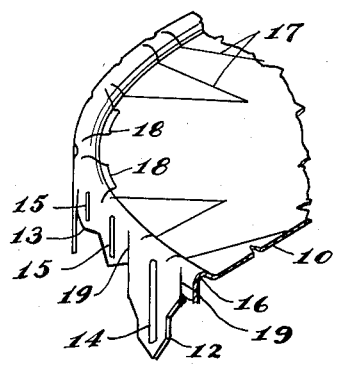
Fig. 3 is a perspective fragmentary view of the seal.
Figure 4:
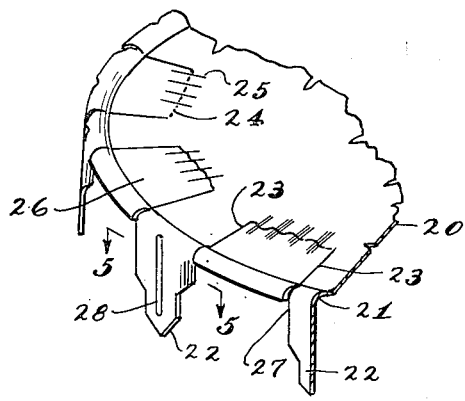
Fig. 4 is a perspective fragmentary view of a modified form of the seal.
Figure 5:
Fig. 5 is a section taken on line 5—5 of Fig. 4.

In the modificatoin shown in Fig. 4 the recessed circular flat wall 20 has a peripheral curled rim 21 similar to that shown in Figs. 1-3, from which extend long teeth or prongs 22 perpendicular to the plane of wall 20. The teeth 13, which prevent the insertion of a prying instrument, are omitted, but the portions of wall and rim intermediate the teeth are weakened by suitable means, such as slits or radial sheared lines or slits 23 and partial perforations 24 extending through corrugations 25 of predetermined length. These corrugations stiffen flaps 26 so that when the latter are pried up forcibly only a short distance, a break occurs at 24. Flaps 26 thus serve as shields against the insertion of a tool to pry up teeth 22. To further prevent the insertion of a tool near the base of a tooth 22 the side edges 27 are bent back as shown in Fig. 5. These, in addition to ribs 28, also help to stiffen the teeth. Dot and dash line 29 indicates the outer periphery of rim 21.

The application of the novel seal is not restricted to wooden casks but may also be performed on barrels or similar containers made from other penetratable material than wood, such as soft metal, special plastic compositions, etc., a special tool being used therefor which forms the subject matter of my application filed simultaneously herewith. The tool consists essentially of a guide for the teeth, and a plunger or punch with which the seal may be driven into the wood. The tool must preferably conform with the barrel surface of the cask though the seal as manufactured can have a flat face which becomes curved as the seal is secured to the cask with the tool.

Having thus described my invention, I claim:

1. A tag seal stamped of a single piece of sheet metal comprising a face surface suitable for carrying indicia, a rim around said face surface, a plurality of spaced teeth extending from said rim perpendicular to the plane of said face surface, the rim and portions of said face surface positioned intermediate said teeth being provided with weakening slits to be detachable by breakage, and corrugations provided with perforations extending between said weakening slits in said face surface.

2. A tag seal stamped of a single piece of sheet metal comprising a face surface suitable for carrying indicia, a curled rim around said face surface, a plurality of spaced teeth extending from said rim perpendicular to the plane of said face surface, radial perforations adjacent to the base of each of said teeth, a weakening line from a perforation adjacent to each tooth to the perforation adjacent to the next tooth, and radial corrugations across said weakening line to prevent bending without breakage.

3. A seal according to claim 2, including longitudinal reinforcing ribs in said teeth, the side edges of said teeth being bent towards the center of said face surface to further stiffen said teeth and to make the insertion of a tool under a tooth of an attached seal more difficult.

HENRY NIERHAUS.

REFERENCES CITED

The following references are of record in the file of this patent:

UNITED STATES PATENTS

| Number | Name | Date |
|---|---|---|
| 610,405 | Lacoste | Sept. 6, 1898 |
| 1,227,143 | Hothersall | May 22, 1917 |

FOREIGN PATENTS

| Number | Country | Date |
|---|---|---|
| 396,443 | France | Apr. 9, 1909 |